Sept. 15, 1959  D. R. KERSTETTER  2,904,717
COMPOSITE ELECTRODE STRUCTURE
Filed June 6, 1958
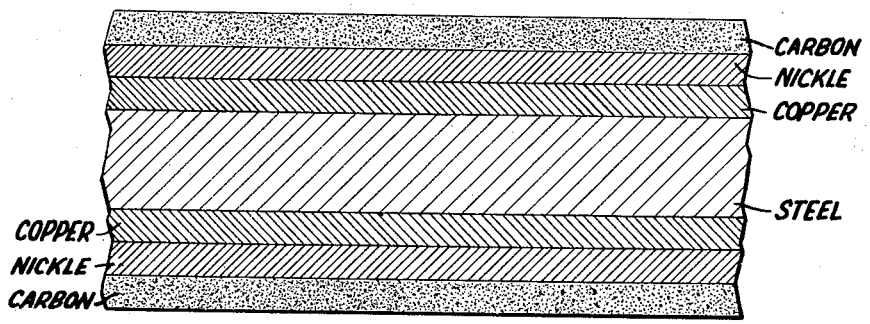
INVENTOR
DONALD R. KERSTETTER
BY
ATTORNEY United States Patent Office 2,904,717
Patented Sept. 15, 1959

2,904,717
COMPOSITE ELECTRODE STRUCTURE

Donald R. Kerstetter, Emporium, Pa., assignor, by mesne assignments, to Sylvania Electric Products Inc., Wilmington, Del., a corporation of Delaware Application June 6, 1958, Serial No. 740,446

3 Claims. (Cl. 313—355)

This invention relates to composite structures or electrodes of the type normally employed in electron discharge devices.

Many types of electrodes utilized in electron discharge devices or tubes such as anodes, shields, radiators, etc. operate at high temperatures. In order to maintain the operating temperature of these electrodes at a relatively low value, they are normally coated with a "black" heat dissipating material such as carbon.

With the adoption of steel as the core material for a large number of electrodes, it was found preferable to coat the steel with another metal such as nickel to inhibit the diffusion of carbon into the steel. This diffusion causes removal of the carbon from the electrode surface, thereby reducing heat dissipation from the electrode.

The demand for smaller tubes requiring smaller electrodes with correspondingly more limited heat dissipation areas which are capable of delivering an ever-increasing power output has aggravated the problem of constructing low cost suitable electrode structures. It has been found that although nickel reduces the diffusion of carbon, the percentage removal of carbon from the surface of such an electrode operated in a high power output tube is so large as to be unsatisfactory. In addition, the amount of nickel needed to appropriately inhibit carbon diffusion in the lower power output tubes is becoming prohibitive from a cost viewpoint.

Accordingly, an object of the invention is to reduce removal of carbon or blackening material from the surface of an electrode during operation of the tube.

A further object is the provision of an improved carbon diffusion barrier in electron tube structures.

Another object is the provision of a unique composite electrode adapted for use in electron tubes.

The foregoing objects are achieved in one aspect of the invention by the provision of a composite electrode having a steel core, an exterior layer of carbon for dissipating heat, and a thin layer of copper disposed intermediate the steel and carbon. The copper film or layer serves as an excellent carbon diffusion barrier. In order to prevent oxidation of the electrode and to facilitate carbon deposition, a very thin coating of nickel may be deposited over the copper.

For a better understanding of the invention, reference is made to the following description taken in conjunction with the accompanying drawing which illustrates in cross-section a composite electrode constructed in accordance with one aspect of the invention.

Referring to the drawing, an electrode such as an anode capable of being employed in electron tubes is shown as having a steel core. The core may be of a steel containing a small percentage, e.g., .02%, of aluminum by weight. This type of steel is known as "aluminum-killed" steel, and is believed to have a low gas evolution rate. The core is covered with successive layers, films or coatings of copper and nickel. These layers may be deposited upon the steel in any manner such as by plating or cladding operations. The exterior coating on the composite electrode is a "black" material, preferably one containing carbon. This exterior coating may be deposited by spraying, gassifying or electro-phoretic deposition of lampblack, boneblack, etc. The carbon is used on the electrode to provide the heat dissipation charactersties required.

It has been found that the copper coating or film serves as an excellent carbon diffusion barrier. Carbon diffuses into steel at a very rapid rate and into nickel at a somewhat lower rate while diffusion into copper is practicably unmeasurable. One convenient method of evaluating carbonized material is through observation of the period of time the material can withstand a given temperature without loss of carbon. For instance, carbonized nickel plated steel having 5% nickel by weight may tend to begin loosing carbon in about 4 minutes at 1475° F., while 10% nickel by weight of carbonized nickel plated steel or 20% nickel by weight of carbonized nickel clad steel tends to begin loosing carbon in about 8 minutes at 1475° F. The nickel coating in the latter material may be over 7 microns thick. The loss of carbon occurs from diffusion through the nickel and into the steel.

It has been found that when the steel is covered with a coating of copper deposited in accordance with one aspect of the invention, the carbonized composite structure can withstand temperatures above 1475° F. for over an hour and above 1700° F. for a shorter period of time without any noticeable removal of carbon. This data indicates a marked improvement in carbonized electrodes.

The thin nickel layer utilized in the composite structure provides several advantageous features. Since nickel has a relatively high melting point, the problems of vaporization or sublimation are minimized. Also, experience has shown that nickel is well suited for receiving and holding carbon. In addition, the gas evolution rate from the nickel at tube operating temperatures is small and the nickel coating tends to make the composite structure oxidation resistant.

The thickness of the copper layer has been found to be preferably within the range of .5 micron to 3.0 microns. Increasing the copper coating thickness tends to reduce diffusion and removal of the carbon. However, when the copper thickness exceeds approximately 3 microns, the copper tends to lower the melting point of the surface metal by a combination with the nickel, thereby causing vaporization of the copper when the tube is processed or operated at high anode temperatures.

When the copper film is employed over the steel core of the composite structure, it has been found that the nickel coating can be reduced appreciably, thereby providing a cost savings, while at the same time improving the over-all characteristics of the structure. Preferably, the nickel layer thickness ranges from 1.5 microns to 3.2 microns for these improved electron tube electrodes. This range takes into account the function of the nickel in the structure and the cost of the structure. It has been found that in tubes employing anodes, etc. which operate at extremely high temperatures, the addition of a copper film plus a nickel coating of 7 microns or more in thickness allows use of a carbonized electrode not heretofore deemed possible.

A composite electrode of the type described herein employing a copper interlay between the steel core and nickel coating generally provides an improved structure at a lower cost. In addition, an electron discharge device employing this structure has improved qualities due to the constant and sustained heat dissipation characteristics of the carbonized electrodes.

Although several embodiments of the invention have been shown and described, it will be apparent to those skilled in the art that various changes and modifications may be made without departing from the scope of the invention as defined by the appended claims.

What is claimed is:

1. A composite electrode adapted to be operated in electron discharge devices at elevated temperatures comprising a steel core, an exterior layer of carbon for dissipating heat, said carbon being normally diffusable in said steel core at the elevated temperatures, a coating of copper covering said steel core forming a carbon diffusion barrier, and an oxidation resistant coating of nickel interposed between said copper coating and said exterior carbon layer.

2. A composite electrode according to claim 1 wherein the copper coating thickness is from .50 micron to 3.0 microns.

3. A composite electrode according to claim 1 wherein the copper coating thickness is from .50 micron to 3.0 microns and the nickel coating thickness is from 1.0 microns to 7.0 microns.

References Cited in the file of this patent

UNITED STATES PATENTS

| | | |
|---|---|---|
| 1,865,449 | Wuertz | July 5, 1932 |
| 1,934,477 | Barton | Nov. 7, 1933 |
| 2,361,203 | Holdaway et al. | Oct. 24, 1944 |
| 2,725,617 | Sternberg | Dec. 6, 1955 |

FOREIGN PATENTS

| | | |
|---|---|---|
| 462,964 | Germany | July 19, 1928 |